United States Defensive Publication [19] (H) [11] T986,005

Cook [43] Sep. 4, 1979

[54] PHOTOGRAPHIC FILMS

[75] Inventor: Alan H. Cook, Manningtree, England

[73] Assignee: Bexford Limited, London, England

[21] Appl. No.: 971,217

[22] Filed: Dec. 20, 1978

Related U.S. Application Data

[63] Continuation of Ser. No. 867,928, Jan. 9, 1978, abandoned.

[30] Foreign Application Priority Data

Nov. 15, 1977 [GB] United Kingdom ..... 47444/77

[51] Int. Cl.[2] ..... G03C 1/78

[52] U.S. Cl. ..... 96/87 R

[57] ABSTRACT

Light-sensitive photographic emulsion layers of photographic films are bonded directly, i.e. without an intermediate gelatin subbing layer, to a polymeric subbing layer containing adhesion-promoting particles of an inorganic oxide such as silica having a nominal particle size of 0.001 to 10 μm and present in an amount 5 to 80% by weight. The polymeric subbing layer may be corona discharge treated before the application of the photographic emulsion layer. The subbing polymer may comprise a homopolymer or copolymer of styrene; a copolymer of butadiene; a copolymer of a vinyl ester; a polyester or copolyester; a polyurethane; a copolymer comprising an acrylic acid ester and/or a methacrylic acid ester; a copolymer of vinyl chloride; or a copolymer of vinylidene chloride. The preferred film support is a polyethylene terephthalate film.

13 Claims, No Sheets Drawing,

22 Pages Specification

The file of this unexamined application may be inspected and copies thereof may be purchased (849 O.G. 1221, Apr. 9, 1968).